United States Patent
Miller et al.

(10) Patent No.: US 7,644,085 B2
(45) Date of Patent: Jan. 5, 2010

(54) DIRECTED GRAPH APPROACH FOR CONSTRUCTING A TREE REPRESENTATION OF AN ACCESS CONTROL LIST

(75) Inventors: Stephen H. Miller, Round Rock, TX (US); Narender R. Vangati, Round Rock, TX (US)

(73) Assignee: Agere Systems Inc., Allentown, PA (US)

( * ) Notice: Subject to any disclaimer, the term of this patent is extended or adjusted under 35 U.S.C. 154(b) by 866 days.

(21) Appl. No.: 10/723,160

(22) Filed: Nov. 26, 2003

(65) Prior Publication Data

US 2005/0114655 A1    May 26, 2005

(51) Int. Cl.
    *G07F 17/30* (2006.01)
(52) U.S. Cl. .................. 707/9; 707/1; 707/2; 707/7; 707/8; 707/10; 707/100; 707/101; 707/200; 709/208; 709/227; 709/230
(58) Field of Classification Search .................. None
    See application file for complete search history.

(56) References Cited

U.S. PATENT DOCUMENTS

| | | | | |
|---|---|---|---|---|
| 5,509,006 | A * | 4/1996 | Wilford et al. | 370/401 |
| 6,651,096 | B1 * | 11/2003 | Gai et al. | 709/223 |
| 6,996,662 | B2 * | 2/2006 | Miller et al. | 711/108 |
| 7,075,926 | B2 * | 7/2006 | Cathey et al. | 370/389 |
| 7,149,216 | B1 * | 12/2006 | Cheriton | 370/392 |
| 2002/0085560 | A1 * | 7/2002 | Cathey et al. | 370/392 |
| 2003/0005146 | A1 * | 1/2003 | Miller et al. | 709/238 |
| 2003/0188198 | A1 | 10/2003 | Holdsworth et al. | |
| 2004/0078683 | A1 * | 4/2004 | Buia et al. | 714/37 |
| 2004/0260818 | A1 * | 12/2004 | Valois et al. | 709/229 |
| 2005/0114655 | A1 * | 5/2005 | Miller et al. | 713/163 |
| 2005/0114657 | A1 | 5/2005 | Kumar et al. | |

OTHER PUBLICATIONS

"Security Overview", by Instructor: Joonwon Lee, Date: Fall 2001 (Go to: camars.kaist.ac.kr/courses/530/2001/security.ppt ).*
"Waterken Web", by Waterken Inc. http://www.waterken.com/dev/Web/Calculus/2003-11-16.html, Date: Nov. 16, 2003.*

(Continued)

*Primary Examiner*—Neveen Abel Jalil
*Assistant Examiner*—Farhan M Syed
(74) *Attorney, Agent, or Firm*—Ryan, Mason & Lewis, LLP

(57) ABSTRACT

Techniques are disclosed for generating a representation of an access control list, the representation being utilizable in a network processor or other type of processor to perform packet filtering or other type of access control list based function. A plurality of rules of the access control list are determined, each of at least a subset of the rules having a plurality of fields and a corresponding action. The rules are processed to generate a multi-level tree representation of the access control list, in which each of one or more of the levels of the tree representation is associated with a corresponding one of the fields. At least one level of the tree representation comprises a plurality of nodes, with two or more of the nodes of that level having a common subtree, and the tree representation including only a single copy of that subtree. The tree representation is characterizable as a directed graph in which each of the two nodes having the common subtree points to the single copy of the common subtree.

18 Claims, 4 Drawing Sheets

OTHER PUBLICATIONS

M. Koch, L. V.Mancini, and F. Parisi-Presicce. Decidability of safety in graph-based models for access control. In European Symposium on Research in Computer Security, pp. 243-299, 2002.*

"Security Overview", by Instructor Joonwoon Lee, Fall 2001 (Go to: camars.kaist.ac.kr/courses/530/2001/security.ppt ).*

* cited by examiner

ACCESS CONTROL LIST (ACL)

RULE 1 : SrcAddr<10.10.10.1> DstAddr<20.20.20.1> Accept;
RULE 2 : SrcAddr<10.10.10.3> DstAddr<20.20.20.3> Accept;
RULE 3 : SrcAddr<10.10.10.*> DstAddr<20.20.20.3> Deny;
RULE 4 : SrcAddr<10.10.20.1> DstAddr<20.20.20.4> Accept;
RULE 5 : SrcAddr<10.10.20.1> DstAddr<*.*.*.*>   Deny;
RULE 6 : SrcAddr<10.10.20.2> DstAddr<20.20.20.*> Accept;
RULE 7 : SrcAddr<10.10.20.*> DstAddr<20.20.20.3> Deny;
RULE 8 : SrcAddr<*.*.*.*>    DstAddr<20.20.20.4> Accept;
RULE 9 : SrcAddr<*.*.*.*>    DstAddr<*.*.*.*>   Deny;

DIRECTED GRAPH APPROACH FOR CONSTRUCTING A TREE REPRESENTATION OF AN ACCESS CONTROL LIST

RELATED APPLICATION(S)

The present application is related to U.S. patent application Ser. No. 10/723,150, filed concurrently herewith and entitled "Access Control List Constructed as a Tree of Matching Tables," which is incorporated by reference herein.

FIELD OF THE INVENTION

The present invention relates generally to network processors or other types of processors utilizable in conjunction with processing operations, such as routing or switching, performed on packets or other protocol data units (PDUs), and more particularly to access control lists (ACLs) utilized by such processors.

BACKGROUND OF THE INVENTION

Network elements such as routers or switches typically utilize ACLs to implement packet filtering or other similar functions. A given ACL generally comprises a set of rules, with each rule having one or more fields and a corresponding action. The fields of the rule define a particular pattern that may be associated with a packet, such as particular source and destination addresses in the packet filtering context, with the corresponding action specifying an action that is taken if a packet matches the particular pattern. Generally, the ACL rules are scanned for each packet arriving in a router or switch to determine if a match exists between the packet and any of the patterns. Depending on the pattern matched, the corresponding action may be either to accept or to deny the packet. ACLs typically imply an ordered matching, that is, an ordered list of the rules is utilized, and the first rule in the ordered list of rules having a pattern which matches the packet is applied to that packet.

It is desirable in many high-rate packet processing applications to configure network processors to perform ACL-based packet filtering operations. A network processor generally controls the flow of packets between a physical transmission medium and a switch fabric in a router or switch. A given router or switch may include multiple network processors arranged, by way of example, in the form of an array of line or port cards with one or more of the processors associated with each of the cards.

Although network processors are becoming increasingly powerful, they nonetheless continue to face a significant challenge in providing line rate performance for ACL-based packet filtering. This challenge is attributable in large part to deficiencies associated with conventional techniques for implementing ACLs, as will be outlined below.

One such conventional technique involves the use of ternary content addressable memories (TCAMs), which are specialized memory devices incorporating on-chip logic for performing lookups. Since TCAMs utilize hardware to achieve enhanced lookup performance, they tend to be expensive to build and also consume large amounts of power. These cost and power requirements increase substantially as the number of rules and number of fields per rule in an ACL increase.

TCAMs are also not very flexible in terms of storing multiple ACLs, each of which may include different arrangements of rules and fields. As a result, TCAMs may not be practical for use in a network processor.

Another conventional technique involves storing the complete set of ACL rules in a simple set of tables or other linear format, with the rules being applied sequentially to each received packet in the manner previously described. Unfortunately, this technique is also problematic in that the processing operations associated with applying the rules to each received packet are in many cases inefficient, and can thus degrade the performance of the network processor. In addition, the amount of memory required to store the rule set can be excessive, particularly as the number of rules and number of fields per rule in an ACL increase. The excessive memory requirements are particularly problematic in the network processor context, since network processors typically have limited internal memory as well as bandwidth restrictions associated with external memory accesses.

It is therefore apparent that a need exists for improved techniques for implementing an ACL, particularly in conjunction with utilization of the ACL to provide packet filtering or related functions in a network processor.

SUMMARY OF THE INVENTION

The present invention in accordance with one aspect thereof provides techniques for generating a particularly efficient representation of an ACL. The representation is utilizable in a network processor or other type of processor to perform packet filtering or other type of ACL-based function.

The representation is generated by determining a plurality of rules of the ACL, each of at least a subset of the rules having a plurality of fields and a corresponding action, and processing the rules to generate a multi-level tree representation of the ACL, in which each of one or more of the levels of the tree representation is associated with a corresponding one of the fields. At least one level of the tree representation, such as the root level, comprises a plurality of nodes, with two or more of the nodes of that level having a common subtree, and the tree representation including only a single copy of that subtree. The tree representation is characterizable as a directed graph in which each of the two nodes having the common subtree points to the single copy of the common subtree.

In an illustrative embodiment, the fields of the ACL rules comprise at least first and second fields, with the first field comprising a source address field and the second field comprising a destination address field. The first field in this embodiment corresponds to the root level of the tree representation, and the root level includes a plurality of nodes, with two or more of the nodes of that level having a common subtree, and each pointing to the single copy of the common subtree. A second level of the tree representation may also include a plurality of nodes, each being associated with a subtree of a given one of the plurality of nodes of the root level of the tree representation.

In accordance with another aspect of the invention, for each level of the tree representation that corresponds to a field of an access control list rule, a master list of nodes is maintained. Each of the nodes on the list may comprise, for example, information characterizing one or more field values associated with that node, one or more subtree pointers for that node, and a reference count indicating how many ancestor nodes are pointing to that node. The tree representation is generated by sequentially processing the rules of the access control list.

The processing for a given rule may include applying values of fields of the given rule to one or more existing nodes of the tree representation. In applying a particular value of a field of the rule to a given node, a copy is made of the node, the field value is applied to the copied node, and the resultant updated node is added to the master list of the corresponding level. The updated node is then compared with other nodes of the master list. If a duplicate node is found, the copied node is deleted and a pointer to the duplicate node is provided to an ancestor node that points to the given node. A subtree pointer of the ancestor node is updated to the duplicate node pointer. A reference count of the duplicate node now pointed to by the ancestor node is incremented, and a reference count of the given node previously pointed to by the ancestor node is decremented. Similar processing is used for other field values of the access control list rules.

The present invention in the illustrative embodiment provides significant advantages relative to conventional techniques. For example, the above-described directed graph approach and its associated elimination of redundant subtrees leads to a substantial reduction in the amount of memory required to store the tree representation of an ACL. This allows more complex ACL rule sets to be implemented within a given amount of memory. In addition, the amount of time associated with downloading the tree representation into a network processor or otherwise processing the tree representation is considerably reduced.

DETAILED DESCRIPTION OF THE INVENTION

The invention will be illustrated herein in conjunction with an exemplary information processing system. The system includes a network processor that utilizes an ACL configured in a particular manner. It should be understood, however, that the invention is more generally applicable to any processor in which it is desirable to provide a more efficient representation of an ACL, and thus improved performance of packet filtering or other ACL-based functions than would otherwise be possible using the conventional techniques described above.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions or combinations of these and other devices.

The term "ACL-based processing element" as used herein is intended to include any portion of a processor or other type of logic, processing circuitry, firmware or software which is capable of implementing at least a portion of an ACL-based function, such as packet filtering. A packet filter is one possible example of an ACL-based processing element.

The term "memory circuitry" as used herein is intended to include a separate stand-alone memory as well as a particular portion of a larger memory, and may refer to internal memory, external memory or combinations thereof.

The terms "protocol data unit" and "PDU" as used herein are intended to include a packet, or other identifiable grouping of information.

Figure 1:
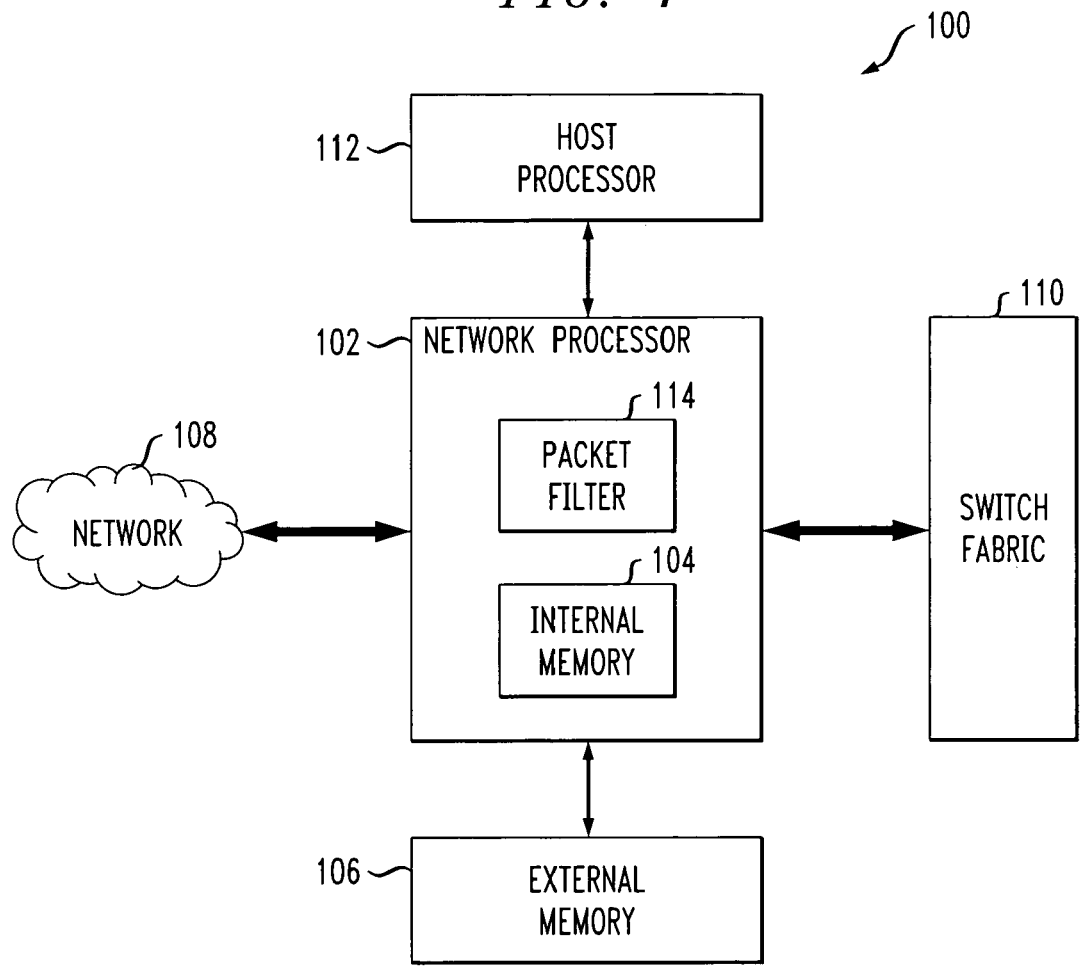
FIG. 1 is a simplified block diagram of an information processing system in which the present invention is implemented.

FIG. 1 shows an information processing system 100 in which the invention is implemented. The system 100 includes a network processor 102 having an internal memory 104. The network processor 102 is coupled to an external memory 106 as shown, and is configured to provide an interface between a network 108 over which packets or other PDUs are carried and a switch fabric 110 which controls switching of PDU data. The processor 102 and its associated external memory 106 may be implemented, e.g., as one or more integrated circuits installed on a line card or port card of a router or switch. In such a configuration, the switch fabric 110 is generally considered to be a part of the router or switch.

One or both of the internal and external memories 104, 106 may be utilized to implement otherwise conventional network processor memory elements such as PDU buffer memory, queuing and dispatch buffer memory, etc.

Also coupled to the network processor 102 is an associated host processor 112. The host processor 112 may be configured to communicate with the network processor 102 over a standard bus architecture, e.g., a peripheral component interconnect (PCI) bus.

In accordance with an aspect of the invention, the network processor 102 includes a packet filter 114 configured to perform packet filtering operations utilizing a tree representation of an ACL. The manner in which the tree representation is generated will be described in greater detail in conjunction with FIGS. 2 and 3. Alternative embodiments may include, in addition to or in place of the packet filter 114, other types of ACL-based processing elements. Also, although identified as a packet filter, element 114 may be more generally utilized in network processor 102 to perform filtering on other types of PDUs.

It is to be appreciated that the particular arrangement of system elements shown in FIG. 1 is presented by way of illustrative example only. More particularly, as previously noted, the invention can be implemented in any type of processor, and is not limited to any particular PDU processing application. The system 100 and network processor 102 as illustrated in FIG. 1 are considerably simplified for clarity of discussion, and may include other elements in addition to or in place of those specifically shown, including one or more elements of a type commonly found in a conventional implementation of such a system and network processor. For example, the network processor may include a classifier, a traffic manager, a scheduler, queuing and dispatch logic, one or more memory controllers, interface circuitry for interfacing the network processor with the network 108, the switch fabric 110, the host processor 112 and other external devices, as well as other conventional elements not explicitly shown in the figure. These and other conventional elements, being well understood by those skilled in the art, are not described in detail herein.

The functionality of the network processor 102 as described herein may be implemented at least in part in the form of software program code. For example, the packet filter 114 or other type of ACL-based functionality may be implemented at least in part utilizing elements that are programmable via instructions or other software that may be supplied to the network processor-102 via the host processor 112 or other suitable mechanism.

In the illustrative embodiment, software in the host processor 112 is configured to generate a tree representation of an ACL, and the tree representation is subsequently downloaded from the host processor into memory circuitry associated with the network processor 102. This memory circuitry may comprise internal memory 104, external memory 106, or a combination of both internal and external memory. The tree representation is then utilized by the packet filter 114 to perform packet filtering operations. The invention is not limited with regard to the particular packet filtering or other ACL-based operations that are performed utilizing the tree representation, and such operations can be performed in an otherwise conventional manner. Also, in alternative embodiments the tree representation may be generated elsewhere in the system 100, such as in the network processor 102 itself, or using a combination of system elements, such as the host processor 112 and the network processor 102.

The above-cited U.S. patent application Ser. No. 10/723, 150 discloses a number of techniques for generating a tree representation of an ACL. One such technique determines a set of rules of the ACL, and processes the rules to generate a multi-level tree representation of the ACL. The rule determination and processing may be implemented in the host processor 112, in the network processor 102, in a combination of these elements, or in one or more other system elements. Generally, each of one or more of the levels of the tree is associated with a corresponding one of the fields of the ACL rules. In addition, at least one level of the tree other than a root level of the tree comprises a plurality of nodes, with at least two of the nodes at that level each having a separate matching table associated therewith. The matching tables may comprise, by way of example, longest prefix matching (LPM) tables. This tree representation of multiple LPM tables is also referred to as "in-line chaining" of LPM tables, since an LPM table at a given level of the tree is associated not with the entire field of that level but instead only with a particular field value from the previous level.

Generation of an exemplary tree representation will be described below in conjunction with FIGS. 2 and 3A. An example directed graph approach to generating a more compact tree representation will then be described in conjunction with FIG. 3B. In these examples, the fields of the ACL rules include first and second fields, corresponding to respective source and destination address fields utilized in Internet Protocol (IP) packet filtering.

The tree representations described herein provide significant improvements over other arrangements which involve use of LPM tables. Such other arrangements include, for example, the use of a separate LPM table for each field, an approach referred to as the per-field LPM approach, and described in detail in the above-cited U.S. patent application Ser. No. 10/723,150. The per-field LPM approach generally involves mapping each field of the ACL rule set to a corresponding LPM table, with matching results from each of the LPM tables being combined and utilized to access an ACL table.

An algorithm suitable for generating a tree representation for an ACL in the illustrative embodiment of the invention will now be described. This algorithm assumes source and destination address fields, for simplicity and clarity of illustration, although it is to be appreciated that the invention is not limited to use in the IP packet filtering context. It should also be understood that other algorithms can be used to generate tree representations in accordance with the invention.

Generally, the tree representation is constructed by processing the ACL rule set. At the root level, a first node is created for a given value in the first field of the first rule of the rule set. The remaining field values of the first rule, and the field values of the remaining rules, are then processed sequentially, with each value being compared to existing values at the appropriate node(s) of the tree. More particularly, a given value may be compared with each existing value to determine if a match exists.

When comparing, it is preferable to compare only the smallest number of bits necessary to determine if a match exists. For example, a given IP address value 10.*.*.* when compared to an existing value 20.*.*.* will not result in a match, but the given address value 10.*.*.* when compared to an existing value 10.10.*.* will result in a match since the smallest "signature" of the given address value is 10 and it matches the existing value. Similarly, a given address value 10.20.*.* when compared to an existing value 10.*.*.* will result in a match.

If there is no match, the given value is simply added to the current node and the algorithm proceeds to the corresponding subtree to process the rest of the fields of the rule.

If there is match between the given value and an existing value, there are the following three possibilities.

1. If the values are identical, then the algorithm follows the subtree for that value to apply the rest of the fields of the rule. Once this is done, the algorithm returns to process an additional rule, if any.

2. If the given value is more specific than the existing value (e.g., a given value 10.20.*.* is more specific than an existing value 10.*.*.*), then a copy of the subtree for the existing value (e.g., 10.*.*.*) is made, and the rest of the fields in the rule are applied to this subtree copy. It is possible that this subtree copy may also completely supercede the remaining fields, in which case nothing further needs to be done for the rule. But if the subtree copy is changed in any way, for example, if the remaining fields cause the subtree copy to be modified, the current field value (e.g., 10.20.*.*) is added to the corresponding node and the node is connected to the modified subtree copy. In either case, once this is done, the algorithm returns to process an additional rule, if any.

3. If the given value is less specific than the existing value (e.g., a given value 10.*.*.* is less specific than an existing value 10.20.*.*), the algorithm proceeds down the subtree. Once a point is reached where the given value is no longer less specific than an existing value, the given value is added to the corresponding node, and the algorithm proceeds to the subtree of that node to process the remaining field values of the rule.

At each node of the tree, the values are preferably organized such that the most specific values (e.g., the values having the lowest number of "don't care" bits) are at the top. This ensures that the algorithm implements its comparisons using the most specific values first, since in two of the three cases described above detection of a match avoids further processing.

A tree representation constructed in the manner described above fully represents the relationships between the rules and their field values. In such a representation, each node of one or more levels of the tree may be implemented as an LPM table that contains only those values that are of interest at that point in the traversal. The tree representation is thus implemented using the previously-described in-line chaining of LPM tables.

An example tree representation constructed using the above algorithm will now be described with reference to FIGS. 2 and 3A.

Figure 2:
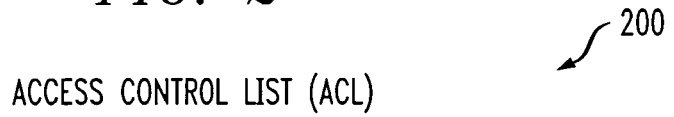
FIG. 2 shows a set of rules associated with an example ACL utilizable in performing packet filtering or related functions in a network processor of the FIG. 1 system.

FIG. 2 shows an ACL 200 comprising a set of rules, denoted Rule 1, Rule 2, . . . Rule 9. Each rule includes two fields, namely a source address field and a destination address field, and a corresponding action, namely accept or deny. This ACL is utilizable for performing packet filtering based on IP version 4 (IPv4) source and destination addresses. The ACL rule set may be processed to generate a tree representation thereof, and the tree representation utilized to perform packet filtering operations in the packet filter 114 of the network processor 102.

Figure 3A:
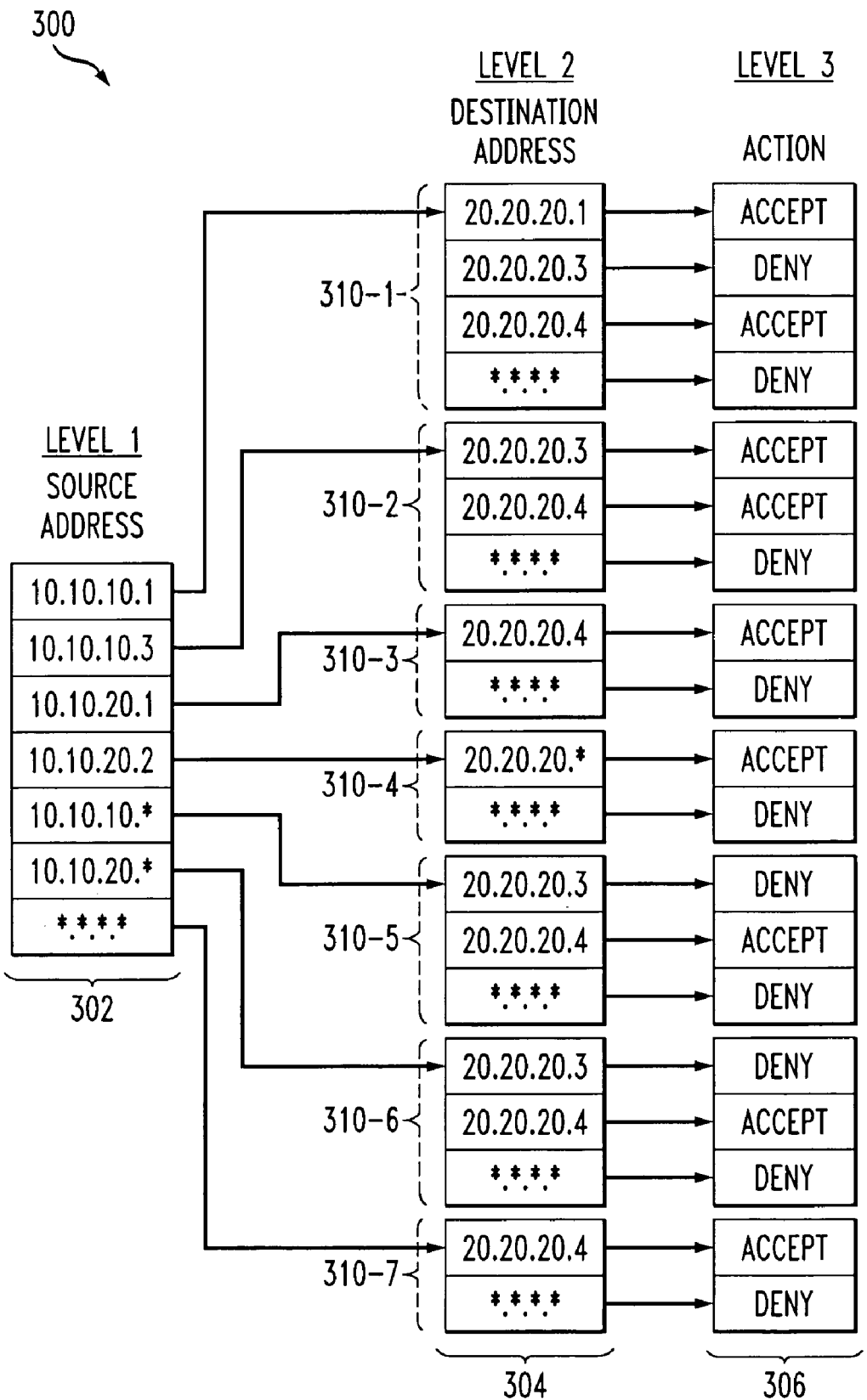
FIG. 3A shows a tree representation of the ACL in the FIG. 2 example.

FIG. 3A shows a tree representation 300 generated by applying the previously-described algorithm to the ACL 200 of FIG. 2.

The tree representation includes three levels, denoted Level 1, Level 2 and Level 3, also indicated generally by reference numerals 302, 304 and 306, respectively. The first two levels of the tree, Level 1 and Level 2, are associated with respective source address and destination address fields of the rule set of the ACL 200. The final level of the tree, Level 3, includes leaf nodes, each associated with a particular action.

The root level of the tree, Level 1, includes a plurality of field values, each corresponding to a distinct source address in the first field of the set of nine rules of ACL 200. The root level in the illustrative embodiment may be viewed as comprising an LPM table or other type of matching table, although this is not a requirement of the invention. Similarly, the root level of the tree may be viewed as comprising only a single node having multiple values associated therewith, although again this is not a requirement.

The second level of the tree, Level 2, includes a plurality of nodes, with each of the nodes at that level having a separate LPM table associated therewith. More specifically, there are a set of seven LPM tables, denoted 310-1, 310-2, ... 310-7, in Level 2, each representing at least a portion of a subtree of a given one of the seven distinct source address values in Level 1. The distinct source address values thus form the root level of the tree representation, and each source address value has an associated Level 2 subtree with the destination addresses to be examined if this source address matches the source address of a given packet. The term "subtree" as used herein may be viewed, in the context of the illustrative embodiment, as comprising only the corresponding Level 2 LPM table for a given node, or the LPM table and its associated Level 3 actions.

By way of example, when a source address of 10.10.10.1 is matched for the first field, it points to the LPM table 310-1 for the destination address where the values of interest are only the 20.20.20.1, 20.20.20.3, 20.20.20.4 and *.*.*.* values. Similarly, each of the other Level 2 nodes has an associated LPM table which includes only those values that are of interest given the corresponding source address match obtained at Level 1.

As indicated previously, the destination address values in the separate LPM tables 310 of Level 2 are arranged in order of decreasing specificity, that is, with the most specific values listed first in each table. Values of equal specificity level are preferably listed in numerical order, for example, in LPM table 310-1, 20.20.20.1 is listed before 20.20.20.3, 20.20.20.3 is listed before 20.20.20.4, and so on.

The rules associated with a given ACL, such as the ACL 200 of FIG. 2, often exhibit a significant amount of redundancy. For example, although the domain of input fields is large, the possible actions for any rule for this ACL include only the two accept or deny actions. Also, for a particular field, the same value can occur in multiple rules, and may result in the same action. In the IPv4 packet filtering context, it is likely that source or destination addresses may be repeated in multiple rules. Moreover, many rules may focus on only one or two fields in the packet, while the other fields are considered "don't care" values.

The present invention addresses this issue of potential redundancy in the tree representation of the ACL by providing a directed graph approach which may in some circumstances result in a more compact tree representation than that shown in FIG. 3A.

With reference to FIG. 3A, it can be seen that certain of the nodes of Level 2 of the tree representation 300 have identical subtrees, corresponding to the separate LPM tables associated with those nodes. More specifically, the subtrees for source address values 10.10.20.1 and *.*.*.* are identical, and the subtrees for source address values 10.10.10.* and 10.10.20.* are identical. Thus, the LPM tables 310-3 and 310-7 are the same, and have the same associated actions, while the LPM tables 310-5 and 310-6 are also the same, and have the same associated actions. This represents redundancy in the tree representation, and such redundancy can be eliminated by using a directed graph approach in accordance with the invention.

Generally, the directed graph approach involves determining if any of the nodes of a given level of the tree share a common subtree, and if so configuring the tree representation to include only a single copy of that subtree. The tree representation is thereby characterizable as a directed graph in which each of the two nodes having the common subtree points to the single copy of the common subtree.

The term "directed graph" as used herein is intended to include, without limitation, a particular type of tree representation in which at least two nodes at a given level of the tree representation point to a common subtree. A directed graph may therefore be viewed as comprising a type of tree representation.

Figure 3B:
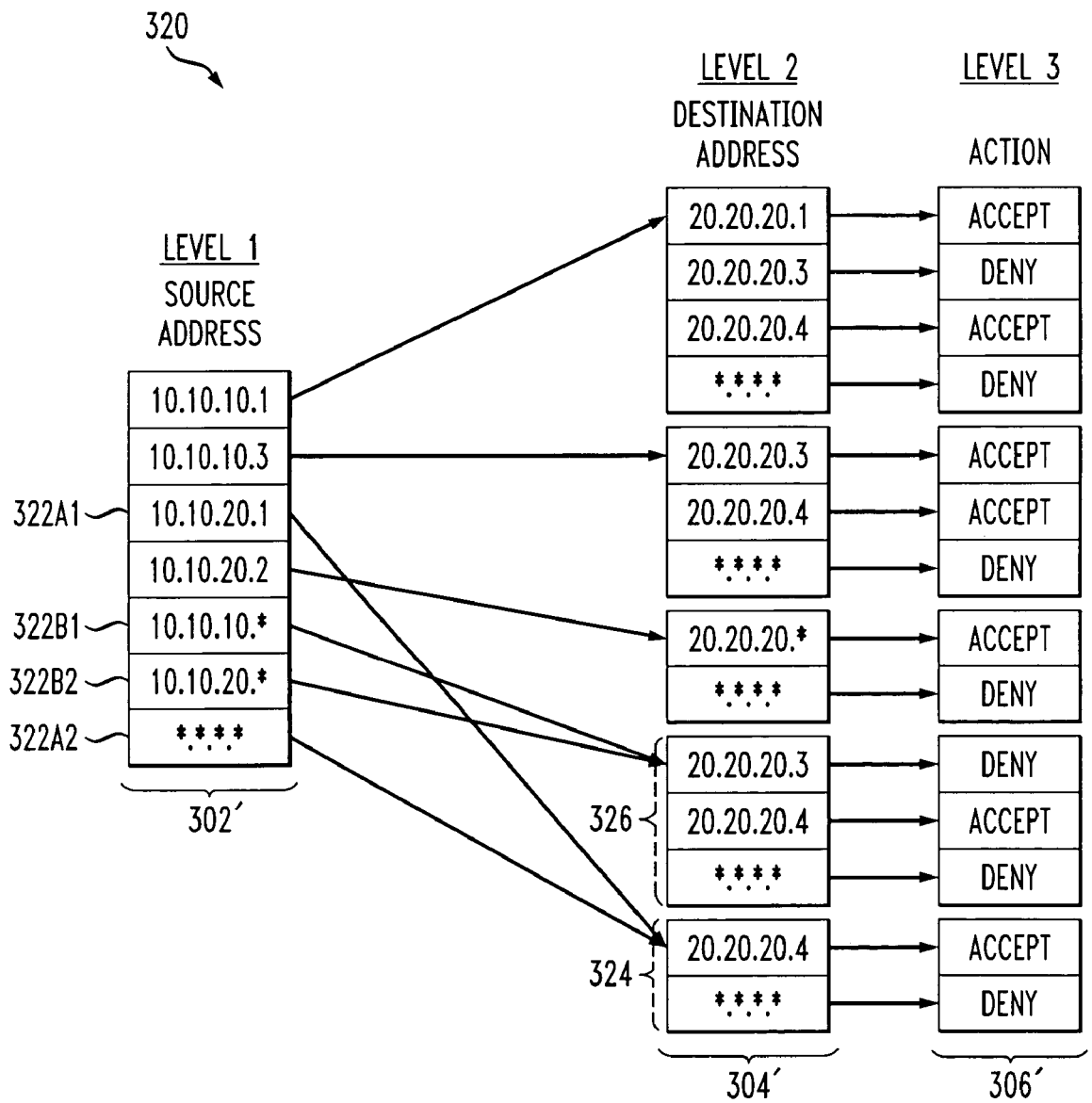
FIG. 3B shows a more compact tree representation of the ACL in the FIG. 2 example, constructed using a directed graph approach in accordance with the invention.

FIG. 3B shows a tree representation 320 which results when the above-described directed graph approach is applied to the tree representation 300 of FIG. 3A. It can be seen that the tree representation 320 has eliminated a certain amount of the redundancy in the tree representation 300, and thus comprises a more compact representation of the ACL 200.

Like the tree representation 300, the tree representation 320 includes three levels, denoted Level 1, Level 2 and Level 3, also indicated generally by reference numerals 302', 304' and 306', respectively. The first two levels of the tree, Level 1 and Level 2, are associated with respective source address and destination address fields of the rule set of the ACL 200. The final level of the tree, Level 3, includes leaf nodes, each associated with a particular action. However, in the tree representation 320, the number of Level 2 LPM tables has been reduced from a total of seven, one corresponding to each of the seven possible source address values of Level 1, to a total of only five, through the use of the directed graph approach.

More specifically, the root level of the representation 320, that is, Level 1, may be viewed in this example as comprising a plurality of nodes, each corresponding to one of the possible source address values of the ACL 200. The two nodes 322A1 and 322A2 share a common subtree, corresponding in FIG. 3A to LPM tables 310-3 and 310-7. The tree representation 320 of FIG. 3B is therefore configured to include only a single copy 324 of that subtree. Similarly, the two nodes 322B1 and 322B2 also share a common subtree, corresponding in FIG. 3A to LPM tables 310-5 and 310-6. The tree representation 320 of FIG. 3B is therefore configured to include only a single copy 326 of that subtree. The tree representation 320 in accordance with the present invention is thus characterizable as a directed graph in which each of the two nodes 322A1 and 322A2 points to the single copy 324 of their common subtree, and each of the two nodes 322B1 and 322B2 points to the single copy 326 of their common subtree.

Tree representations such as those shown in FIGS. 3A and 3B may be stored in memory circuitry associated with the network processor 102. By way of example, the representation may be stored in the form of information characterizing the nodes and their interconnection with other nodes, with such information including, for a given node, one or more field values associated with that node, arranged as a matching table or otherwise, as well as one or more pointers to other nodes to which the given node is connected in the tree representation. The pointers to other nodes are also referred to herein as "subtree pointers." The term "tree representation" as used herein is intended to include, without limitation, such stored information characterizing the nodes and their interconnection with other nodes.

The above-described directed graph approach and its associated elimination of redundant subtrees leads to a substantial reduction in the amount of memory required to store the tree representation of an ACL. This allows more complex ACL rule sets to be implemented within a given amount of memory.

In addition, the amount of time associated with downloading the tree representation into a network processor or otherwise processing the tree representation is considerably reduced.

Yet another advantage is that the full performance benefits of the FIG. 3A tree representation over other representations, such as representations based on the per-field LPM approach, are obtained using a more compact structure.

These and other improvements associated with use of the directed graph approach become increasingly significant as the number of rules and number of fields per rule in an ACL increase.

Exemplary techniques for generating a directed graph tree representation of the type described in conjunction with FIG. 3B will now be described. It is to be appreciated that these techniques are presented by way of illustrative example only, and a directed graph tree representation in accordance with the invention may be generated using numerous other techniques.

In this approach, the directed graph tree representation may be constructed and maintained incrementally, as each rule in the ACL is processed. For each level in the tree that corresponds to a field of the ACL, a master list of nodes is maintained. Each node may comprise, for example, the field values for that node, one or more subtree pointers, and a reference count indicating how many ancestor nodes are pointing to that node. The term "ancestor node" as used herein is intended to include, without limitation, a parent node of a given node, that is, a node associated with a level of the tree representation above the level of the given node, where "above" in this context denotes closer to the root level. As mentioned previously, other types of information may be used to characterize the nodes and their interconnection with other nodes in the tree representation.

Whenever a field value in a rule is applied to a given node, a copy is made of the node, the field value is applied to the node, and the resultant updated node is added to the master list of the corresponding level. At this time, the copied node is compared with all the nodes in the master list and if a duplicate node is found, the copied node is deleted and a pointer to the duplicate master list node is returned to an ancestor node that points to the given node. The subtree pointer of the ancestor node is updated to point to this duplicate master list node. Then, the reference count of the duplicate node now pointed to by the ancestor node is incremented, and the reference count of the given node previously pointed to by the ancestor node is decremented.

This process of making a copy of a node and comparing the copied node with members of the master list of the corresponding level can be computationally complex in certain applications. However, the complexity of the process may be considerably reduced using one or more of the following additional techniques.

1. For a node having a reference count of one, the change can be applied "in place" without the need for copying since only one ancestor node is pointing to that node.

2. When processing a global default rule, there is no need for copying since the global default rule applies in the same way to all the nodes.

3. Whenever there is no copy made, the corresponding node does not need to be processed with the master list.

4. While processing the master list, any nodes having a reference count of zero can be immediately deleted from the list. This helps to reduce the number of nodes in the master list.

5. In order to limit the number of copies needed, a copy pointer may be maintained for each node in the master list. When a copied node is compared to the master list and a duplicate node is found, instead of deleting the copied node, it may be added as a copy to the duplicate node. When a subsequent rule descends to this node and needs to make a copy, the already-existing copy can be used, thereby avoiding the need to create a new copy.

6. For each node in the master list, a signature may be maintained in order to speed up the comparison process. The signature may be generated, by way of example, as a bit operation or other function performed on the field values in the node and any associated subtree pointers. Other types of signatures could also be used. A full comparison of the corresponding subtrees is done only if the node signatures match.

7. When a match is found in the master list, the matching node is moved to the top of the list. It is expected that ACL rules will typically tend to make similar changes in different parts of the tree representation, and this movement of the matching node to the top of the master list can speed up the comparison process for the next copied or changed node.

Again, it should be emphasized that, while the foregoing techniques facilitate the generation of a directed graph tree representation in the illustrative embodiment, they are not requirements of the invention, and other techniques may be used.

A tree representation generated in accordance with the invention can be stored in an otherwise conventional memory accessible to the network processor 102, such as a static random access memory (SRAM) or a dynamic random access memory (DRAM), implemented as internal memory, external memory or a combination of both. The invention thus avoids the need for expensive specialized hardware such as TCAMs.

The system 100 can be implemented at least in part in the form of network processor integrated circuit installed in a router or switch, as will be described below in conjunction with FIG. 4. Of course, numerous other implementations are possible, and such implementations need not involve routers or switches.

Figure 4:
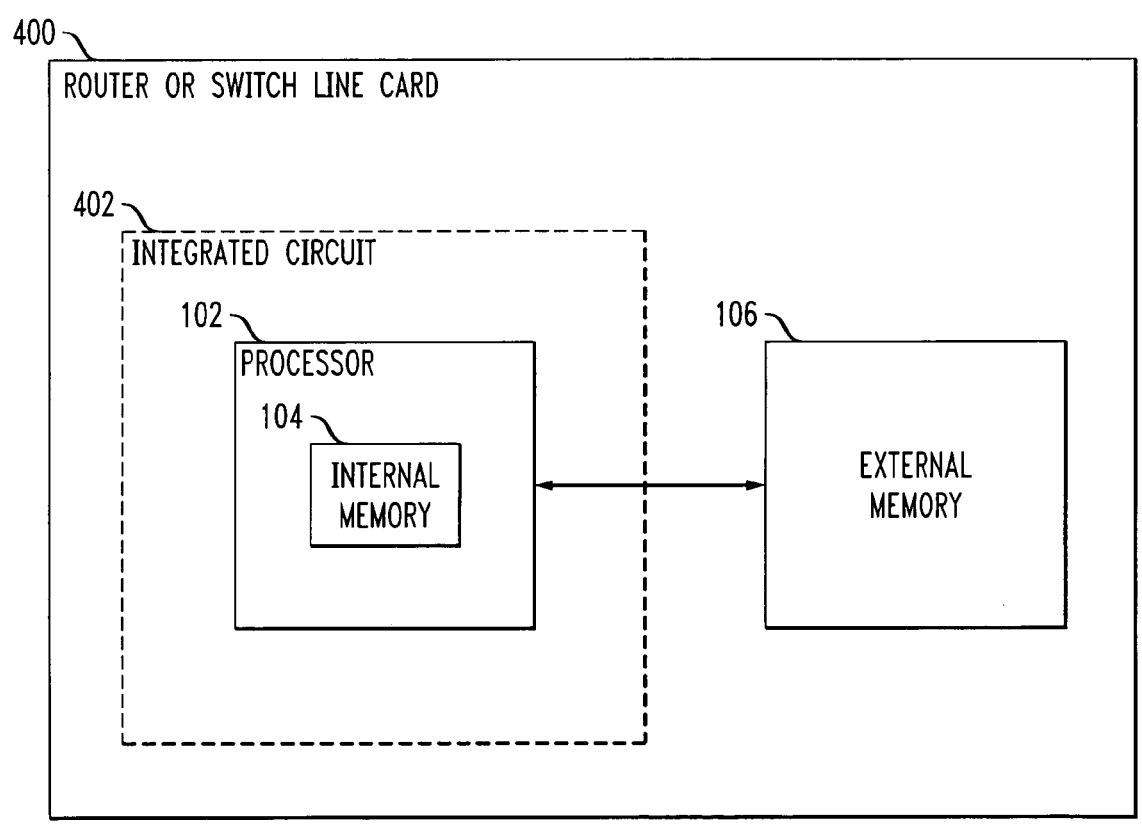
FIG. 4 illustrates one possible implementation of a network processor of the FIG. 1 system as an integrated circuit installed on a line card of a router or switch.

FIG. 4 illustrates an example router or switch line card embodiment of a portion of the system 100 of FIG. 1. In this embodiment, the processing system comprises a line card 400 having at least one integrated circuit 402 installed thereon. The integrated circuit 402 comprises network processor 102 which has internal memory 104. The network processor 102 interacts with external memory 106 on the line card 400. The above-noted host processor may also be installed on the line card 400. A tree representation of an ACL may be stored in internal memory 104, in external memory 106, or using a combination of internal and external memory.

The portion of the processing system as shown in FIG. 4 is considerably simplified for clarity of illustration. It is to be appreciated, however, that the processing system may comprise a router or switch which includes multiple such line cards, and that each of the line cards may include multiple integrated circuits. A similar embodiment may be implemented in the form of a port card in a router or switch.

It should be understood that the particular arrangements of elements shown in FIGS. 1 through 4 are by way of illustrative example only. More particularly, as previously noted, the invention can be implemented in any type of system, utilizing any type of processor, and is not limited to use with packet filtering or any other particular ACL-based function.

Also, as indicated previously herein, the system 100 and network processor 102 may include other elements in addition to or in place of those specifically shown in the figures, including one or more elements of a type commonly found in a conventional implementation of such a system and network processor. These and other conventional elements, being well understood by those skilled in the art, are not described in detail herein.

The above-described embodiments of the invention are thus intended to be illustrative only. The particular ACL rules and corresponding tree representations shown in FIGS. 2 and 3, respectively, should be considered as non-limiting examples, and a wide variety of other rule sets, fields, tree representations and matching tables can be used in implementing the invention. For example, although each rule in the rule set of the illustrative embodiment of FIG. 2 includes the same number of fields, this is not a requirement of the invention, and there may be variation in the number of fields from rule to rule within a given rule set. The particular type and configurations of the matching tables, and the manner in which such tables are associated with nodes of a given level of a tree representation, may be varied in alternative embodiments of the invention. Also, the manner in which an ACL tree representation is stored, processed and otherwise utilized by a network processor or other processor can vary depending upon the particular processing application and the particular characteristics of the ACL-based processing function(s) used in that application. These and numerous other alternative embodiments within the scope of the following claims will be readily apparent to those skilled in the art.

What is claimed is:

1. A method of generating a representation of an access control list, the method comprising the steps of:
   determining a plurality of rules of the access control list, each of at least a subset of the rules having a plurality of fields and a corresponding action; and
   processing the rules to generate a multi-level tree representation of the access control list, each of one or more of the levels of the tree representation being associated with a corresponding one of the fields;
   wherein the determining and processing steps are implemented in a processor and at least a portion of the multi-level tree representation is stored under control of the processor in memory circuitry associated with the processor;
   wherein at least one level of the tree representation comprises a plurality of nodes, with two or more of the nodes of that level having a common subtree, the tree representation including only a single copy of that subtree, the subtree comprising at least one node that is not a leaf node of the tree representation;
   the tree representation being characterizable as a directed graph in which each of the two nodes having the common subtree points to the single copy of the common subtree;
   wherein for at least a given level of the tree representation that corresponds to a field of a rule of the access control list, a master list of nodes is maintained, at least a given such node comprising information characterizing one or more field values associated with that node, one or more subtree pointers for that node, and a reference count indicating how many ancestor nodes are pointing to that node;
   wherein the tree representation is generated by sequentially processing the rules of the access control list, the processing for a given rule comprising applying values of fields of the given rule to one or more existing nodes of the tree representation, and wherein when a particular value of a field of the given rule is applied to a given node, a copy is made of the node, the field value is applied to the copied node, and the resultant updated node is added to the master list of the corresponding level; and
   wherein the updated node is compared with other nodes of the master list and if a duplicate node is found, the copied node is deleted and a pointer to the duplicate node is provided to an ancestor node that points to the given node, a subtree pointer of the ancestor node is updated to the duplicate node pointer, a reference count of the duplicate node now pointed to by the ancestor node is incremented and a reference count of the given node previously pointed to by the ancestor node is decremented.

2. The method of claim 1 wherein the common subtree is implemented at least in part as a matching table.

3. The method of claim 1 wherein the plurality of fields comprises at least first and second fields, the first field comprising a source address field and the second field comprising a destination address field.

4. The method of claim 1 wherein a final level of the tree representation comprises a plurality of leaf nodes, each associated with one of the actions of the plurality of rules.

5. The method of claim 1 wherein the at least one level of the tree representation comprises a root level of the tree representation.

6. The method of claim 5 wherein a second level of the tree representation includes a plurality of nodes, each being associated with a subtree of a given one of the plurality of nodes of the root level of the tree representation.

7. The method of claim 1 wherein for each level of the tree representation that corresponds to a field of a rule of the access control list, a master list of nodes is maintained, each node comprising at least one of information characterizing one or more field values associated with that node, one or more subtree pointers for that node, and a reference count indicating how many ancestor nodes are pointing to that node.

8. The method of claim 1 wherein if a duplicate node is found in the master list, that duplicate node is moved to an initial position in the master list.

9. The method of claim 1 wherein for each node in the master list, a copy pointer is maintained, and wherein when a copied node is compared to the master list and a duplicate node is found, the copied node is added as a copy to the master list for use in conjunction with the processing of a subsequent rule.

10. The method of claim 1 wherein for each node in the master list, a signature is maintained in order to facilitate node comparisons, a full comparison of node subtrees being performed only if a match is obtained between node signatures.

11. The method of claim 10 wherein the signature for a given node is generated as a function of at least one of a field value and a subtree pointer.

12. The method of claim 1 wherein the corresponding actions include at least an accept action and a deny action.

13. The method of claim 1 further including the step of storing at least a portion of the tree representation in memory circuitry accessible to the processor.

14. The method of claim 1 further including the step of utilizing the stored tree representation to perform an access control list based function in the processor.

15. The method of claim 14 wherein the access control list based function comprises packet filtering.

16. An apparatus configured for performing one or more processing operations utilizing a representation of an access control list, the access control list comprising a plurality of rules, each of at least a subset of the rules having a plurality of fields and a corresponding action, the apparatus comprising:
a processor having memory circuitry associated therewith;
the memory circuitry being configured for storing at least a portion of a multi-level tree representation of the access control list, each of one or more of the levels of the tree representation being associated with a corresponding one of the fields;
the processor being operative to utilize the stored tree representation to perform an access control list based function;
wherein at least one level of the tree representation comprises a plurality of nodes, with two or more of the nodes having a common subtree, the tree representation including only a single copy of that subtree, the subtree comprising at least one node that is not a leaf node of the tree representation;
the tree representation being characterizable as a directed graph in which each of the two nodes having the common subtree points to the single copy of the common subtree;
wherein for at least a given level of the tree representation that corresponds to a field of a rule of the access control list, a master list of nodes is maintained, at least a given such node comprising information characterizing one or more field values associated with that node, one or more subtree pointers for that node, and a reference count indicating how many ancestor nodes are pointing to that node;
wherein the tree representation is generated by sequentially processing the rules of the access control list, the processing for a given rule comprising applying values of fields of the given rule to one or more existing nodes of the tree representation, and wherein when a particular value of a field of the given rule is applied to a given node, a copy is made of the node, the field value is applied to the copied node, and the resultant updated node is added to the master list of the corresponding level; and
wherein the updated node is compared with other nodes of the master list and if a duplicate node is found, the copied node is deleted and a pointer to the duplicate node is provided to an ancestor node that points to the given node, a subtree pointer of the ancestor node is updated to the duplicate node pointer, a reference count of the duplicate node now pointed to by the ancestor node is incremented and a reference count of the given node previously pointed to by the ancestor node is decremented.

17. The apparatus of claim 16 wherein the memory circuitry comprises at least one of internal memory and external memory of the processor.

18. An article of manufacture comprising a machine-readable storage medium having program code stored thereon, the program code generating a representation of an access control list, the representation being utilizable in a processor, wherein the program code when executed implements the steps of:
determining a plurality of rules of the access control list, each of at least a subset of the rules having a plurality of fields and a corresponding action; and
processing the rules to generate a multi-level tree representation of the access control list, each of one or more of the levels of the tree representation being associated with a corresponding one of the fields;
wherein at least one level of the tree representation comprises a plurality of nodes, with two or more of the nodes of that level having a common subtree, the tree representation including only a single copy of that subtree, the subtree comprising at least one node that is not a leaf node of the tree representation;
the tree representation being characterizable as a directed graph in which each of the two nodes having the common subtree points to the single copy of the common subtree;
wherein for at least a given level of the tree representation that corresponds to a field of a rule of the access control list, a master list of nodes is maintained, at least a given such node comprising information characterizing one or more field values associated with that node, one or more subtree pointers for that node, and a reference count indicating how many ancestor nodes are pointing to that node;
wherein the tree representation is generated by sequentially processing the rules of the access control list, the processing for a given rule comprising applying values of fields of the given rule to one or more existing nodes of the tree representation, and wherein when a particular value of a field of the given rule is applied to a given node, a copy is made of the node, the field value is applied to the copied node, and the resultant updated node is added to the master list of the corresponding level; and
wherein the updated node is compared with other nodes of the master list and if a duplicate node is found, the copied node is deleted and a pointer to the duplicate node is provided to an ancestor node that points to the given node, a subtree pointer of the ancestor node is updated to the duplicate node pointer, a reference count of the duplicate node now pointed to by the ancestor node is incremented and a reference count of the given node previously pointed to by the ancestor node is decremented.

* * * * *